United States Patent [19]
Huang et al.

[11] Patent Number: 6,078,716
[45] Date of Patent: Jun. 20, 2000

[54] THERMALLY EXPANDED MULTIPLE CORE FIBER

[75] Inventors: Yong Huang, San Jose; Kok Wai Chang, Sunnyvale, both of Calif.

[73] Assignee: E-TEK Dynamics, Inc., San Jose, Calif.

[21] Appl. No.: 09/275,354

[22] Filed: Mar. 23, 1999

[51] Int. Cl.$^7$ ...................................................... G02B 6/02
[52] U.S. Cl. .............................. 385/126; 385/47; 385/43; 385/123
[58] Field of Search ................................. 385/47, 31, 14, 385/33, 15, 42, 18, 43, 11, 24, 122–126; 359/281

[56] References Cited

U.S. PATENT DOCUMENTS

| | | | |
|---|---|---|---|
| 4,178,073 | 12/1979 | Uchida et al. | 350/151 |
| 4,653,852 | 3/1987 | Suzuki et al. | 350/96.33 |
| 4,974,944 | 12/1990 | Chang | 350/377 |
| 5,268,979 | 12/1993 | Weidman | 385/42 |
| 5,355,426 | 10/1994 | Daniel et al. | 385/39 |
| 5,381,503 | 1/1995 | Kanamori et al. | 385/123 |
| 5,446,578 | 8/1995 | Chang et al. | 359/282 |
| 5,471,340 | 11/1995 | Cheng et al. | 359/281 |
| 5,574,596 | 11/1996 | Cheng | 359/484 |
| 5,594,821 | 1/1997 | Cheng | 385/24 |
| 5,644,666 | 7/1997 | Campbell et al. | 385/43 |
| 5,734,763 | 3/1998 | Chang | 385/11 |
| 5,742,722 | 4/1998 | Imoto | 385/126 |
| 5,768,005 | 6/1998 | Cheng et al. | 359/281 |
| 5,825,950 | 10/1998 | Cheng | 385/27 |
| 5,848,208 | 12/1998 | Suzuki et al. | 385/43 |
| 5,930,418 | 7/1999 | Chang | 385/24 |
| 5,930,422 | 7/1999 | Cheng | 385/47 |

*Primary Examiner*—Phan T. H. Palmer
*Attorney, Agent, or Firm*—Blakely, Sokoloff, Taylor & Zafman LLP

[57] ABSTRACT

An optical fiber having a thermally expanded multiple core section. One such multiple core section may be fabricated by fusing together non-etched multiple fiber claddings resulting in the multiple cores having expanded mode fields that are positioned in close proximity to each other in a common cladding, without signal coupling between the cores. The close proximity of the cores having expanded mode fields may allow for tighter alignment of light waves propagated from one core to other cores.

27 Claims, 11 Drawing Sheets

THERMALLY EXPANDED MULTIPLE CORE FIBER

FIELD OF THE INVENTION

This invention relates to the field of fiber optics and, more specifically, to multiple core optical fibers having expanded modal fields.

BACKGROUND

Fiber optics are used in many applications including telecommunications and instrumentation. Data is transmitted by pulsing light waves through the optical fibers. These fibers typically consist of a core surrounded by a cladding, and a protective jacket. The core and cladding are typically made of a silica material. Core diameters are typically in the range of 5 to 10 $\mu$m with an outside fiber diameter of 125 $\mu$m. The core has a higher refractive index than the cladding in order to achieve total internal reflection of the light beam propagating along the core. Optical fibers are also designed with multiple cores in order to increase the amount of information that can be transmitted by optical fibers.

One method for producing multiple core optical fibers consists of inserting a group of single cores, with their respective claddings, into a glass tube and then melting the claddings together forming what is referred to a multi-core preform. The preform is then mounted on a drawing machine and then drawn to fabricate the multiple core fiber. The resulting multiple core fiber consists of multiple cores with a single fused cladding material completely surrounding the cores.

One problem with such a method is that the positioning of the single core fibers, with their respective claddings, inside the tube may not be very accurate. This results in a fiber with cores that are not accurately aligned relative to one another. Inaccurate core alignment adds complexity to switcher and coupler designs utilizing the fiber. Another problem with drawn multiple core fibers is that since their claddings are joined along the entire length of the fiber, the light carried by the individual cores cannot be physically routed to different locations without the use of additional components.

Another prior art method for joining multiple cores involves the use of etching techniques. One problem with this method is that extensive chemical etching of the cladding material is required in order to bring the cores closer together. Such chemical etching may weaken the fiber and introduce stress defects that affect signal propagation through the fiber.

Other types of fibers containing multiple cores exist, known as coupled fibers. Fiber coupling machines fuse together multiple single core fibers to create a fiber section that couples light among the multiple cores. The fibers' jackets are removed along the section to be coupled. The fibers are twisted together, then heated and stretched to fuse the fibers together in order to achieve desired optical characteristics. The heating and stretching process reduces the diameter of the cores and cladding region of the fibers and brings the cores closer together. Such a process, however, may not be suitable for manufacturing multiple core fibers carrying non-coupled signals because the process results in cross-talk, or power coupling, between fiber cores.

SUMMARY OF THE INVENTION

The present invention pertains to a multiple core optical fiber. The multiple core optical fiber includes multiple cores having centers arranged substantially on one line, and a common cladding surrounding the multiple cores along a predetermined length of the multiple cores. Each of the multiple cores has a first mode field diameter inside the predetermined length of the multiple cores different than a second mode field diameter outside the predetermined length.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, numerous specific details are set forth such as examples of specific materials, process steps, process parameters, dimensions, etc. in order to provide a thorough understanding of the present invention. It will be obvious, however, to one skilled in the art that these specific details need not be employed to practice the present invention. In other instances, well known materials or methods have not been described in detail in order to avoid unnecessarily obscuring the present invention.

It should be noted that two fibers are shown in the following figures only for ease of illustration and that the multiple core fiber and its fabrication process are not limited to use of only two fibers.

Figure 1:
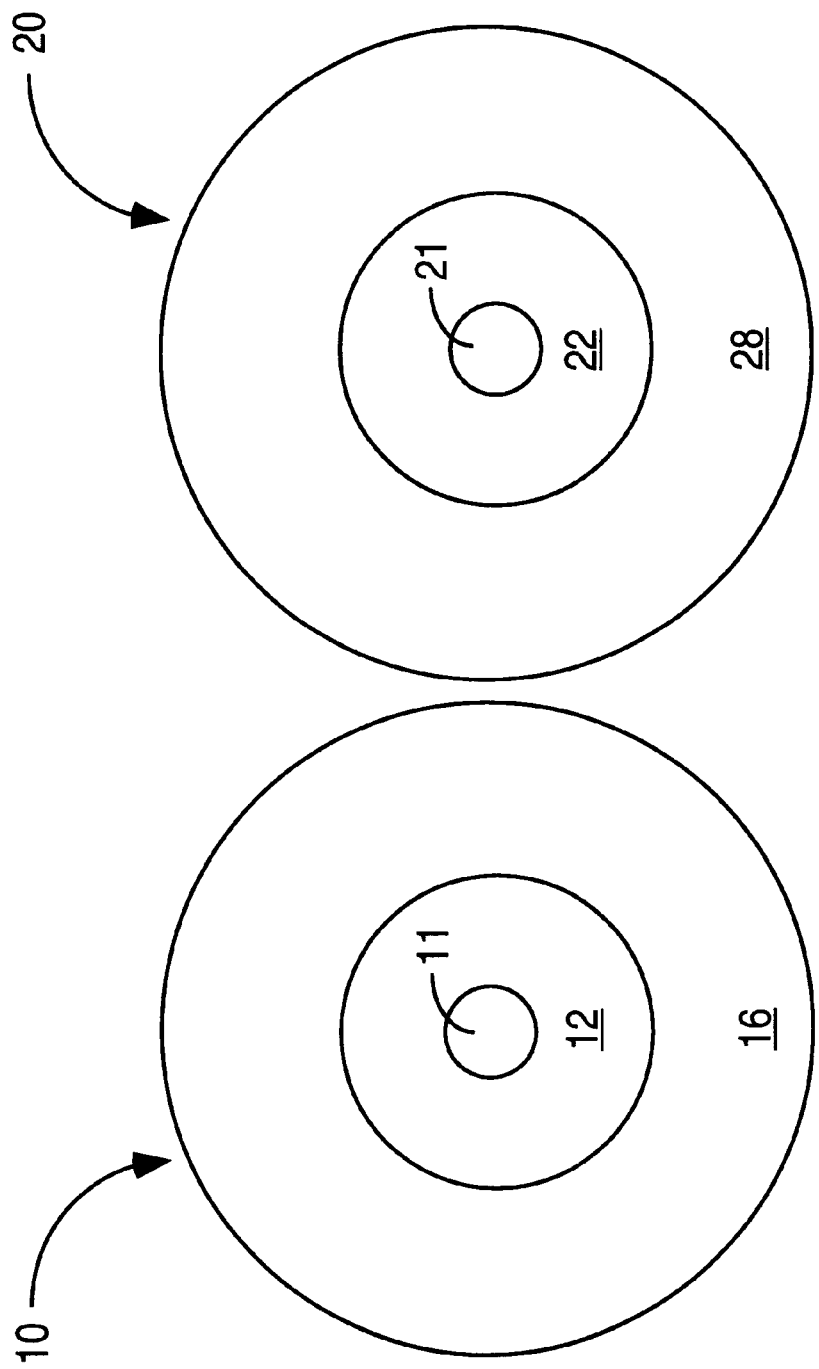
FIG. 1 illustrates a cross-section of two single core fibers.

FIG. 1 illustrates a cross-section of two single core fibers. The fibers 10 and 20 have cores 11 and 21, respectively, surrounded by claddings 12 and 22, respectively. The claddings 12 and 22 are encased in outer jackets 16 and 18, respectively (not drawn to scale). In one embodiment, single mode fibers having step index core profiles are used, for example, SMF 28 manufactured by Corning of Corning, N.Y. SMF 28 fiber has a nominal mode field diameter of approximately 9 microns ($\mu$m). In another embodiment, single mode fibers having other diameters and profiles may be used. In yet another embodiment, fibers carrying more than one mode may be used.

In cores having step index profiles, light waves follow straight line trajectories until they reach the core-cladding boundary, at which the light waves bend abruptly. The propagation of the light waves through the core is based on the numerical aperture (NA) of the core, which is a function of the index of refraction of the core. The numerical aperture is independent of the position of the incident waves because cores with step index profiles have the same index of refraction throughout their radius.

In contrast, for cores with graded index profiles, the index of refraction is a function of the distance along the diameter of the core and, thus, light waves bend continuously, rather than abruptly, near the core-cladding boundary. In addition, because the index profile is graded, the numerical aperture of the core is a function of the position of the entering light waves.

Figure 2:
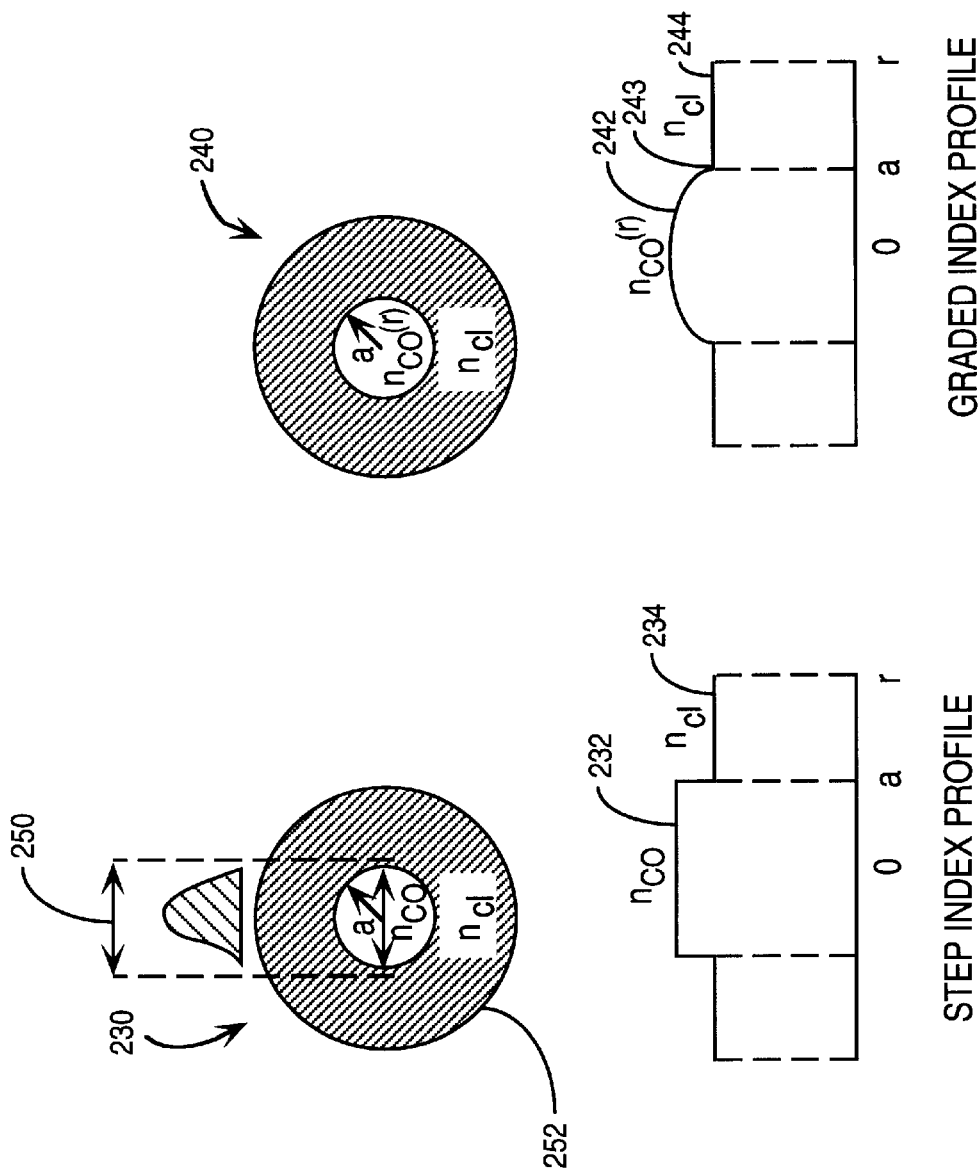
FIG. 2 illustrates the profiles of a step index fiber and a graded index fiber.

FIG. 2 illustrates the profiles of a step index fiber and a graded index fiber. The nomenclature $n_{co}$ is the index of refraction of the core and $n_{cl}$ is the index of refraction of the cladding. For a step index fiber 230 the index of refraction 232 is approximately uniform in the core region. The index of refraction steps down at the core boundary to a lower index of refraction 234 in the cladding region where it remains approximately uniform throughout the cladding. A lower index or refraction is used in the cladding in order to achieve total internal reflection of the light beam as it travels along the core.

For a graded index fiber 240, the index of refraction in the core region 242 is a function of the radial distance from the core center. The index of refraction in the core 242 is given by $n_{co}(r)$ with r·a where a is the core radius and r is the radial distance from the core center. The index of refraction in the core 242 decreases as the radial distance from the core increases until it approximately matches the index of refraction of the cladding 244 at the boundary 243.

Light waves propagating down the core and cladding of the fiber can be characterized by different modes based on electric, magnetic, and electromagnetic fields operating on the fiber. In step index fibers with circular cross sections, as illustrated in FIG. 2, the field distributions can be identified by a combination of the different modes, known as a mode field. The mode field has a light carrying diameter that is not the same as the physical diameter of the fiber. The mode field diameter, for any given wavelength of light, is affected by the indices of refraction of the core and the cladding. The mode field diameter (MFD) is characterized by a hyperbolic function which may be approximated according to the following formula:

$$MFD = 2\omega$$

where $$\omega \approx (NA \times \pi)/\pi$$

and where $\lambda$ equals the wavelength of light propagated through the fiber.

The mode field diameter may extend out into the cladding region and, as such, will be larger than the physical diameter of the core. In one embodiment, for example, for light waves having a wavelength of 1550 nanometers, the mode field diameter 250 may be approximately 9 $\mu$m, whereas the physical core diameter 252 may be approximately 8 $\mu$m.

Referring again to FIG. 1, the single core fibers 10 and 20 are stripped of a portion of their outer jackets 16 and 28, and the claddings 12 and 22 are aligned together along a predetermined length of the exposed claddings. In one embodiment, the claddings 12 and 22 are aligned by placing claddings 12 and 22 on a plate such that the centers of their respective cores are in substantial alignment along one line and held in place using a securing tool. The claddings 12 and 22 are then joined along the predetermined length using a fusion process.

Figure 3:
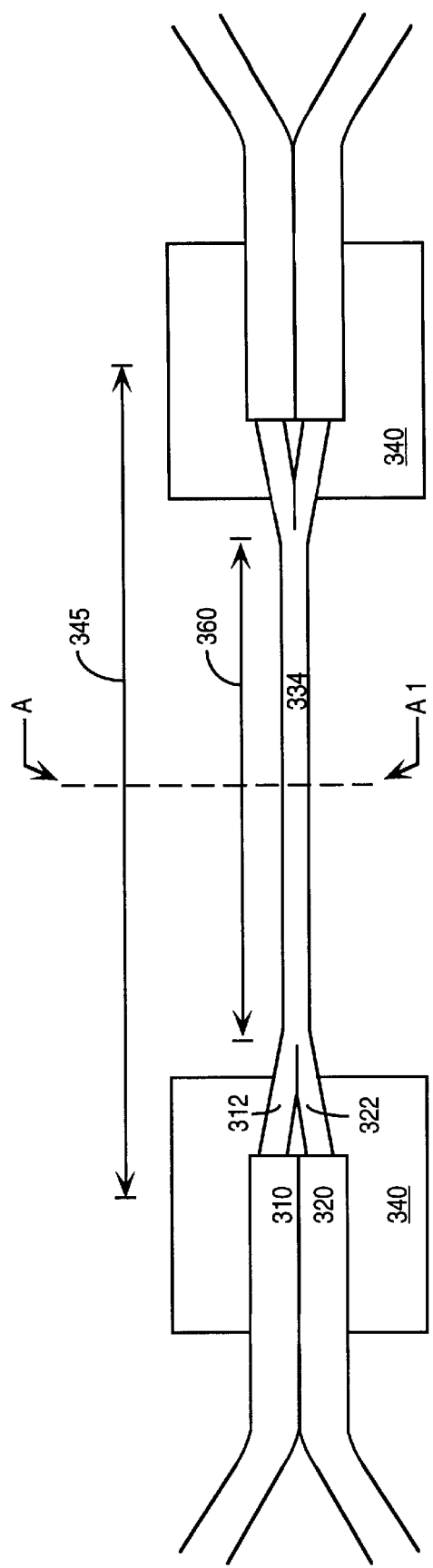
FIG. 3 illustrates one embodiment of a fusion process.

FIG. 3 illustrates one embodiment of a fusion process. The single core fibers 310 and 320 are stripped of their outer jackets, exposing claddings 312 and 322 along segment 345 of the fibers. The fibers 310 and 320 are then placed on an alignment bar 340 that aligns the claddings 312 and 322 along a length 360. In one embodiment, the claddings 312 and 322 are aligned along a length 360 of approximately 8 millimeters. In another embodiment, the claddings 312 and 322 are aligned along a different length.

In one embodiment, a heat source (not shown) located underneath claddings 312 and 322 is applied along the entire length 360. Claddings 312 and 322 are heated to a temperature above the melting point of the cladding material in order to fuse the cladding 312 and 322 of the two cores (not shown). The claddings 312 and 322 are fused together along length 360 forming a common cladding 334. In one embodiment, heat source 470 is a gas flame. In another embodiment, other heat sources may be used that are well known in the art, for examples, an induction heater or a laser.

In one embodiment, the claddings 322 and 312 are heated to a temperature of approximately 1,700 degrees C+/−200 degrees C. In another embodiment, the claddings are heated to other temperatures based on the material used for claddings 322 and 312. As the claddings 312 and 322 are fused together, the heat source operates to gradually expand the mode field diameter of the cores (not shown) in the common cladding region along length 360. The mode field diameters of claddings 312 and 322 outside of length 360 will also be affected by the heat source. However, the mode field diameters of claddings 312 and 322 outside length 360 will expand to a lesser extent than the mode field diameters within common cladding 334 because the claddings outside length 360 are not directly exposed to the heat source and, thus, heated at a lower temperature.

Figure 4:
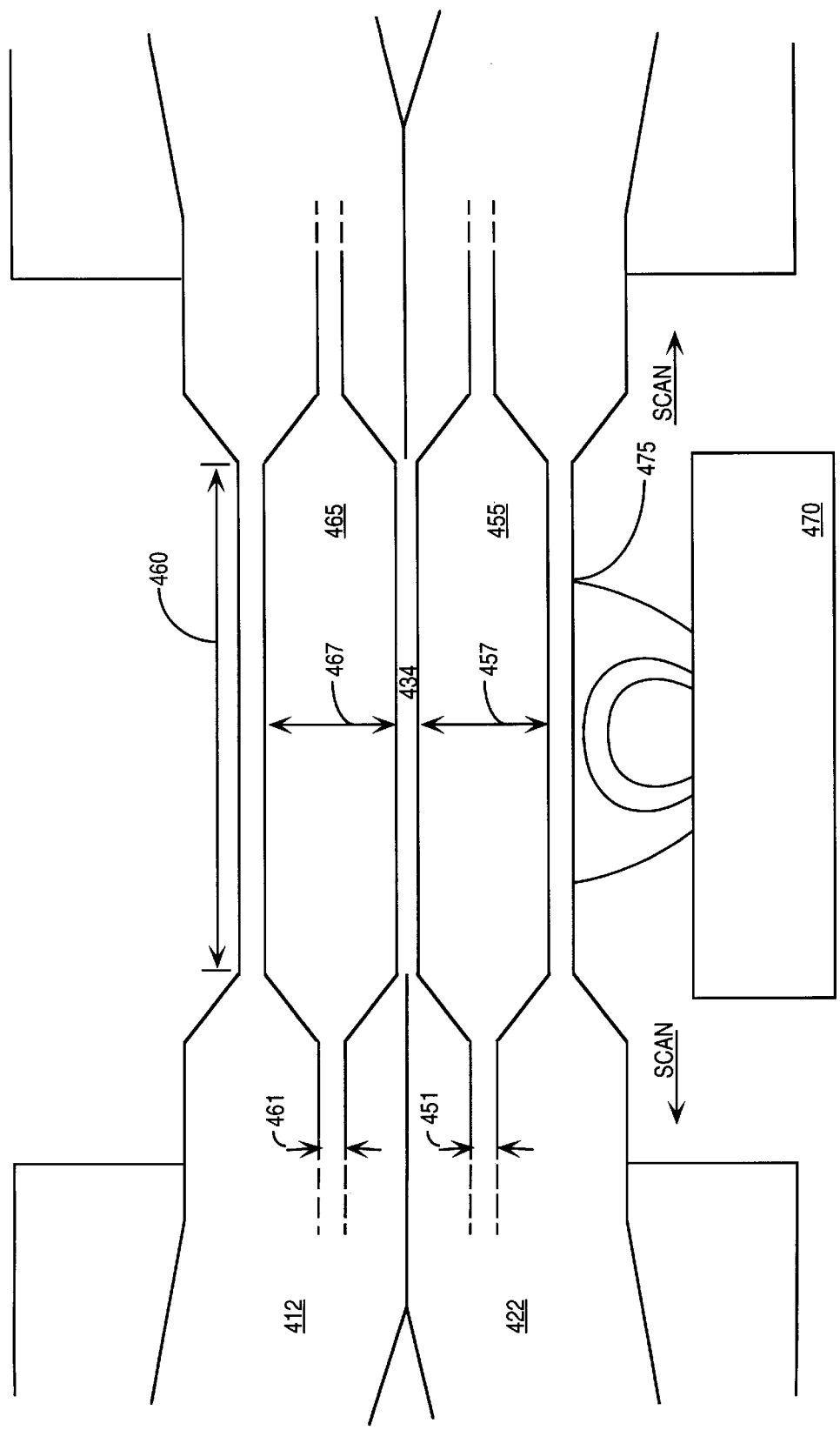
FIG. 4 illustrates another embodiment of a fusion process.

FIG. 4 illustrates another embodiment of a fusion process. A heat source 470 is applied to the exposed common cladding 434 to expand the mode field diameters of the cores inside the cladding. It should be noted that the heat source 470 is drawn on one side of the cores in FIG. 4 only for ease of illustration and that the heat source 470 is actually positioned in a manner to provide for uniform heating of the claddings.

Heat source 470 is applied to a segment of length 460 and continually scanned across length 460 to uniformly expand the mode fields of the cores. When heat source 470 comes into contact 475 along different segments of length 460, claddings 412 and 422 begin to fuse together forming common cladding 434. In addition, the mode fields 455 and 465 of the cores begin to expand from their original diameters 451 and 461, respectively, to diameters 457 and 467, respectively. As the cladding region 434 is heated, the index profiles of the cores inside cladding region 434 change from a step index to that of a graded index that tapers off at the core-cladding boundary as discussed above. In one embodiment, heat source 470 is scanned at a constant rate across length 460. In another embodiment, heat source 470 is scanned across length 460 at a varying rate in order to gradually expand mode fields from their original diameters at the end of length 460 to diameters 467 and 457 in the middle of length 460.

The mode field expansion in the fiber is based on the rate at which the heat source 470 is scanned across length 460 of the common cladding 434. A slower scan rate will result in a greater mode field expansion if the scan time remains the same. In one embodiment, heat source 470 is scanned at a rate of approximately 2 millimeters per second (mm/sec). In another embodiment, heat source 470 is scanned at a different rate to achieve a different mode field expansion. In another embodiment, the scan rate may be varied in a different manner along length 460, for examples, linearly, exponentially, and incrementally stepped. As a result, the mode field of the cores are gradually expanded from their initial diameter to a wider diameter at the center of the length 460 of the fused cladding region.

By changing the index of refraction in the cores to a graded index profile and, thus, expanding the mode field diameters of the cores, light may be propagated through a larger area of the fiber. Changing the index of refraction in a fiber core to a graded index profile results in a narrowing of the width of a light pulsed through the fiber that may allow for an increase in information transmission rate through the fiber.

Referring still to FIG. 4, the change in the index profile alters the numerical aperture of the fiber cores (not shown) and increases their mode field diameters to diameters 457 and 467. In one embodiment, after the scanning stage, the mode field diameters of the cores are expanded by approximately a factor of two. In another embodiment, the mode field diameters are expanded by other factors. If the numerical aperture of a starting single mode core is 0.1, for example, and the mode field diameter is expanded by a factor of 2, then the numerical aperture will be approximately reduced by half. Correspondingly, if the mode field diameter is expanded from 10 μm to 30 μm, for example, then the numerical aperture will be approximately reduce by one third. A lower numerical aperture will reduce the amount of divergent light emitted from the fiber and, thus, may facilitate switching between fiber cores or coupling to other fibers.

In another embodiment, the heat source 460 is scanned for a different time and at a different temperature and rate to reflow the cladding material in order to decrease transmission loss in the fiber cores. Various factors cause transmission loss in the fiber including diameter variations, core and cladding material irregularities, and impurities. By reflowing the core and cladding material, these defects may be reduced.

Figure 5:
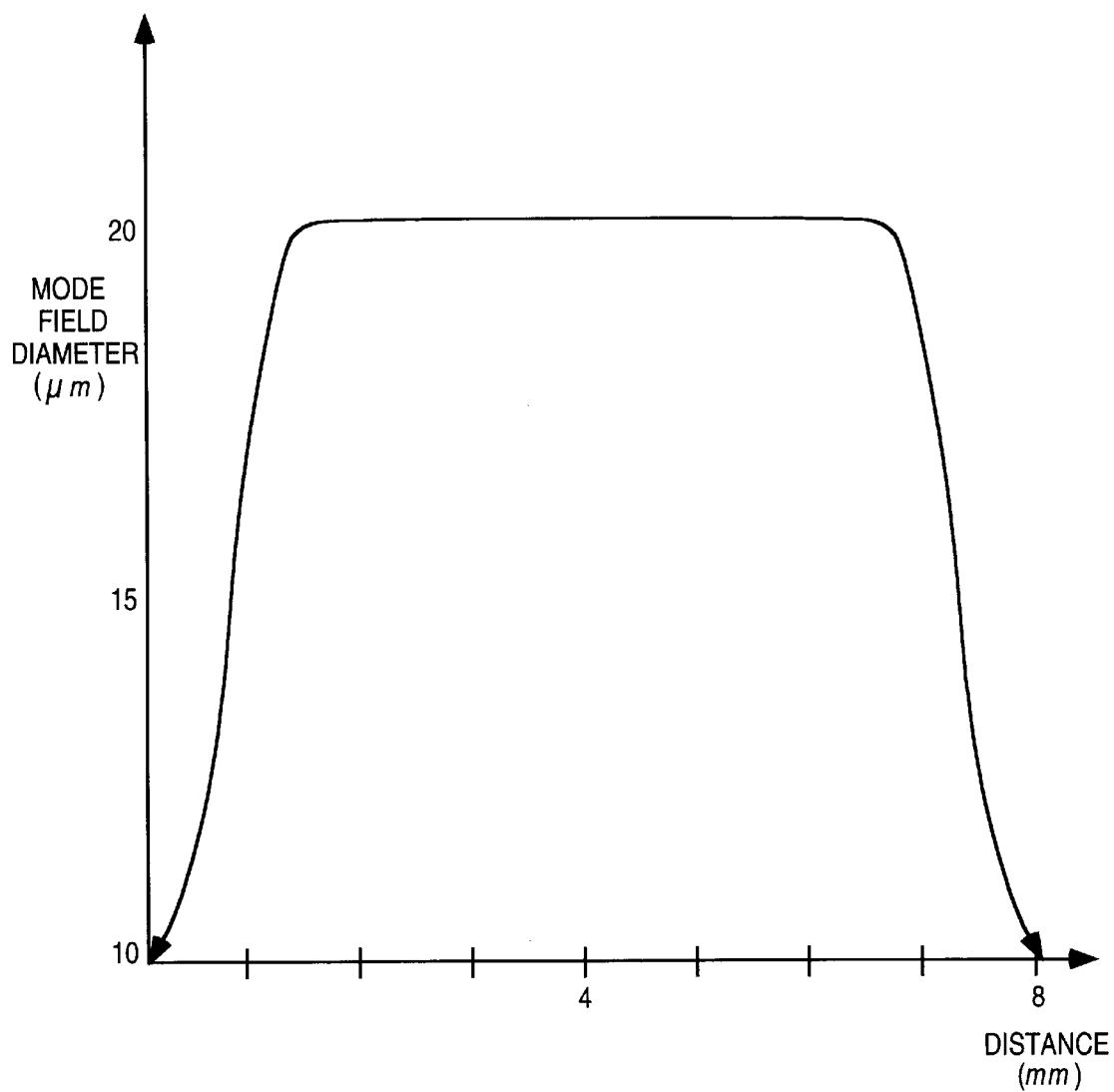
FIG. 5 illustrates a mode field expansion over a length of a fiber.

FIG. 5 illustrates an exemplary mode field expansion over a length of the fiber resulting from use of the above process. In the illustrated example, the mode fields of the fiber cores have been expanded over an 8 mm length of fused cladding material. The mode field diameter of a single core is 10 μm outside the length of the fused cladding material. The heat source is scanned across the 8 mm length, increasing the mode field diameters of the cores to a maximum of approximately 20 μm near the center region of the fused cladding. It should be noted that FIG. 5 illustrates only an example of the mode field distribution. In other embodiments, the mode field diameter may have other distributions over the length of the fused cladding.

Figure 6:
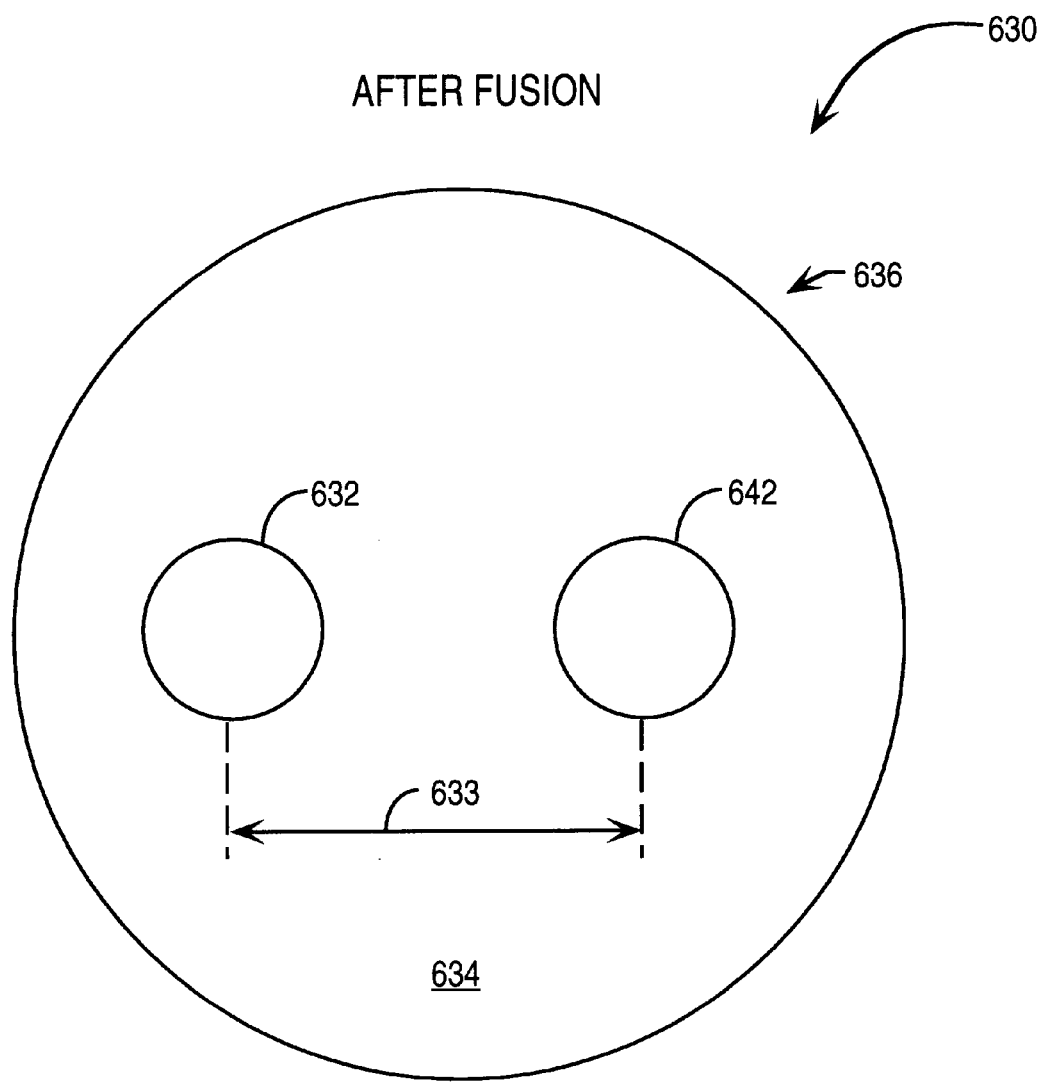
FIG. 6 illustrates a cross-section of one embodiment of a fiber after a fusion process.

FIG. 6 illustrates a cross-section of one embodiment of a fiber after a fusion process. After the fusion process, the cores 632 and 642 of fiber 630 are closer together than before the fusion process. The cores 632 and 642 are also substantially parallel with respect to each other along the length of the fused cladding. In one embodiment, for example, the cladding is fused along a length of 8 millimeters and the centers of the cores 632 and 642 have less than a 4 μm deviation of alignment over the length of the fused cladding. In one embodiment, the spacing 633 between the centers of the cores 632 and 642 after the fusion process is approximately 62.5 μm. In one embodiment, the outer surface 636 of common cladding 634 is approximately circular. In another embodiment, the outer surface 636 of common cladding 634 has other approximate shapes, for example, ovate.

The closer spacing between fiber cores may allow for more precise alignment between the cores than using, for example, two standard 125 μm (outer diameter) single core fibers having centers spaced 125 μm apart, that are inserted into a cylindrical jacket. It should be noted that although the cores have been brought closer together, the distance between the cores remains large enough so that there is no significant coupling, or cross-talk, between the cores.

Figure 7A:
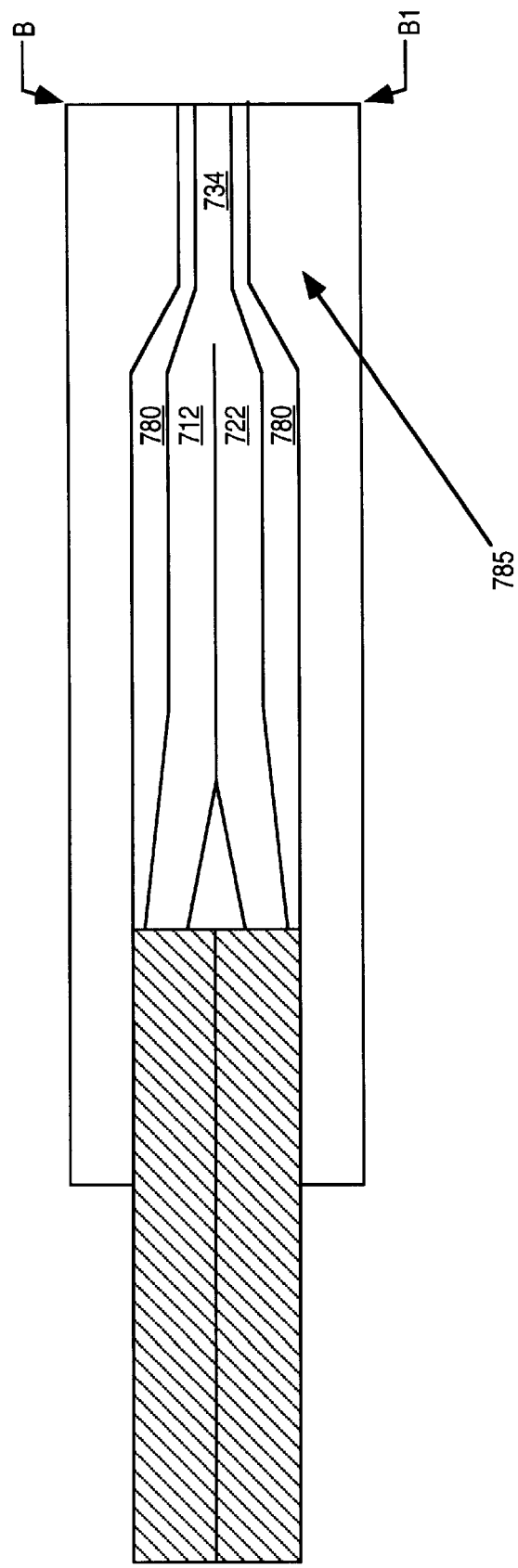
FIG. 7A illustrates one embodiment of a multiple core fiber in a capillary tube.

FIG. 7A illustrates one embodiment of a multiple core fiber in a capillary tube. After the fusion process, the fiber may be cut along a cross section AA1 of FIG. 3 of the region of common cladding and placed into a capillary tube 785 to create a fiber end having multiple non-coupled cores that are in substantial alignment along one line. An epoxy 780 is placed in between the cladding 734 and the capillary tube 780 to hold the cladding stationary within capillary tube 780. Such a fiber may be used in switching or coupling applications with more precision than when using a group of single core fibers placed next to each other. In addition, since the fiber is not processed using a stretching operation, less stressed may be introduced into the fiber than in prior fiber coupling processes. Lower stress in the fiber may result in improved signal transmission performance.

Figure 7B:
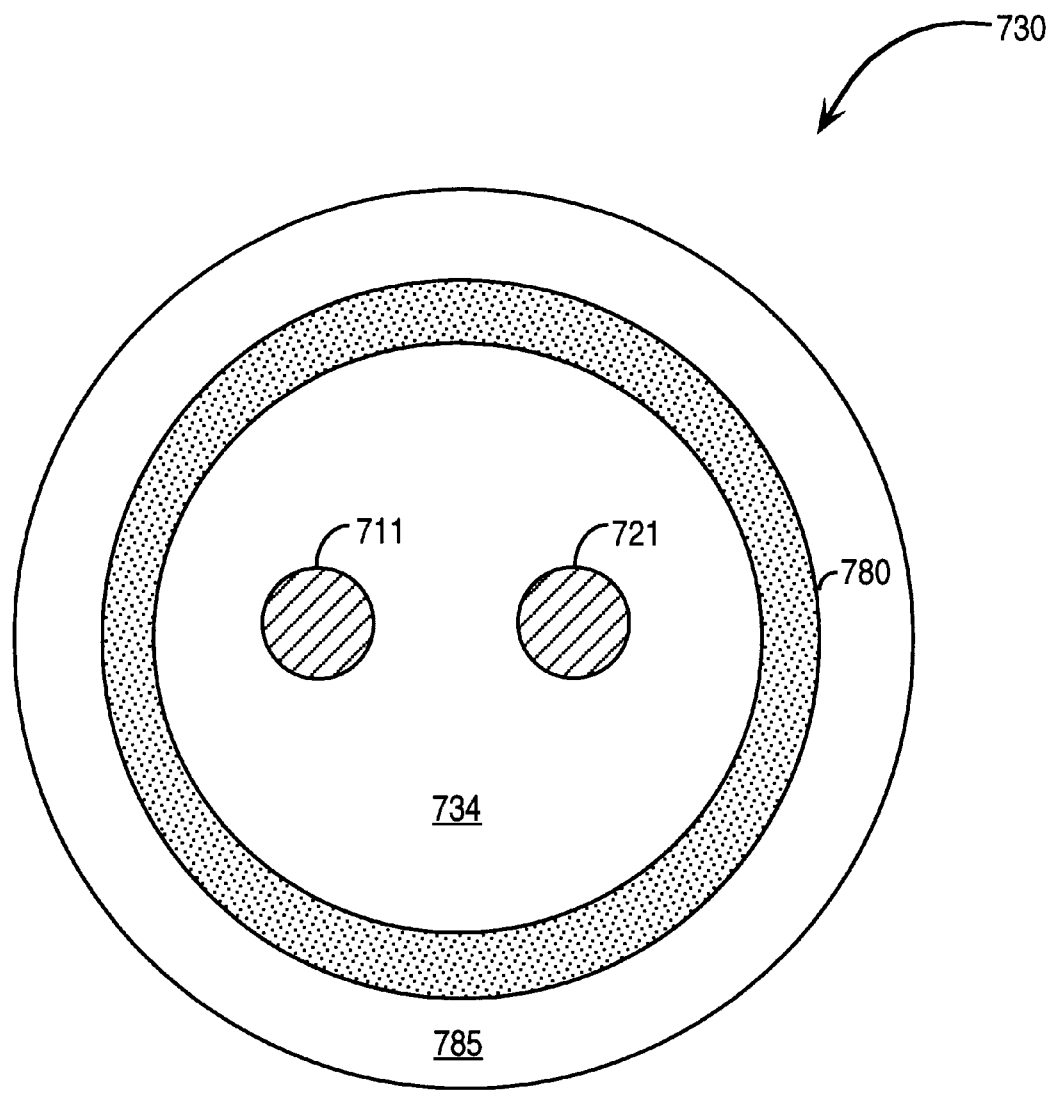
FIG. 7B illustrates a cross-section of one embodiment of a multiple core fiber in a capillary tube.

FIG. 7B illustrates a cross-section of one embodiment of a multiple core fiber in a capillary tube. The cross-section is taken along line BB1 of FIG. 7A. The cores 711 and 721 of fiber 730 are substantially parallel with respect to each other along the length (into the page) of the common cladding 734. In one embodiment, the common cladding 734 resulting after the fusion process is approximately cylindrical resulting in approximately a uniform gap between common cladding 734 and capillary tube 785. As such, epoxy 780 is generally uniformly distributed between the common cladding 734 and the capillary tube 785. The use of less epoxy and the uniform distribution of the epoxy may reduce stress induce effects resulting from the epoxy, thereby improving the reliability of the fiber.

Figure 8:
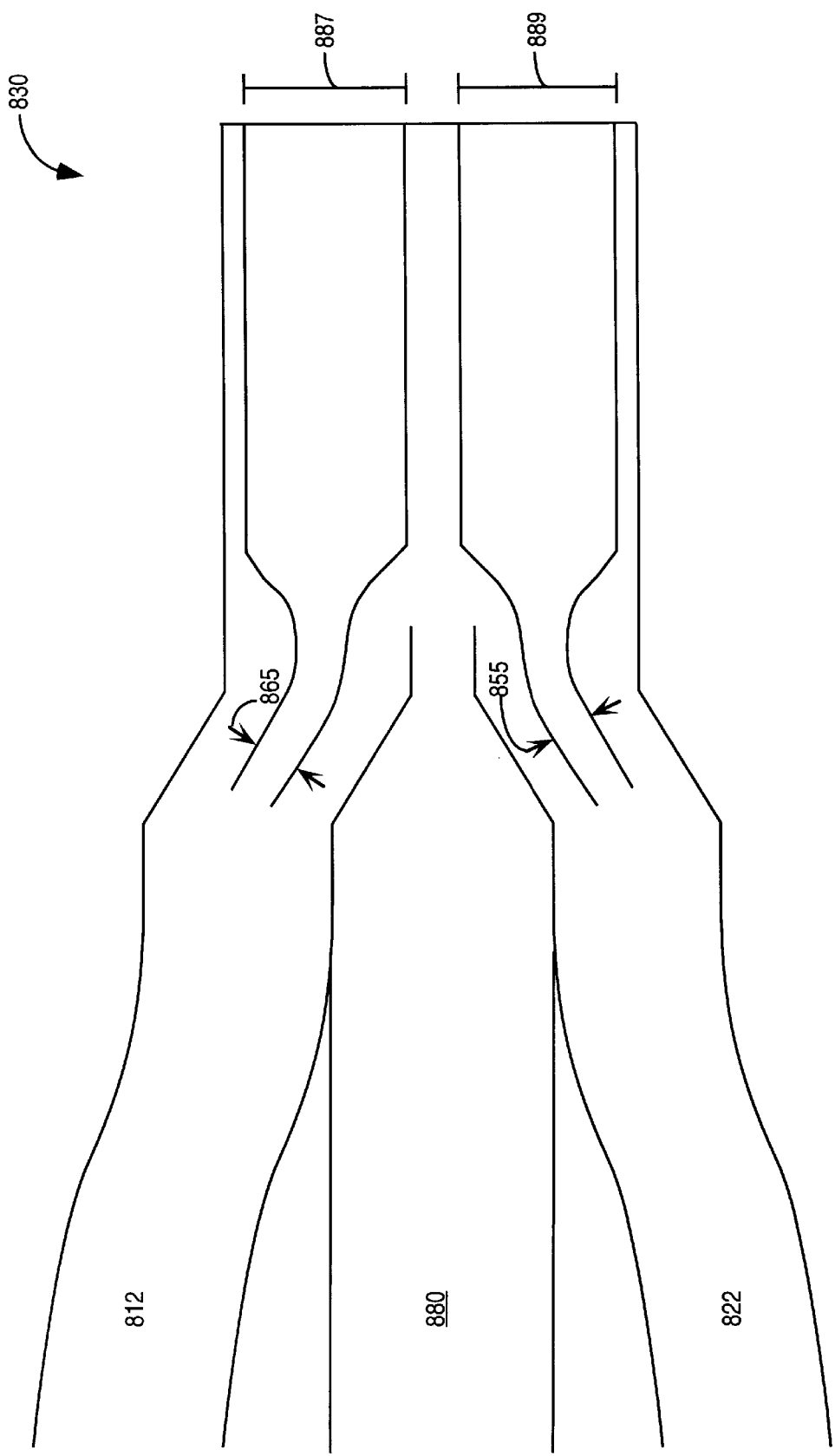
FIG. 8 illustrates a longitudinal cross-section of one embodiment of a multiple core fiber having a non-core spacer.

FIG. 8 illustrates a longitudinal cross-section of one embodiment of a multiple core fiber having a non-core spacer. Multiple core fiber 830 includes a spacer 880 in between claddings 812 and 822. As discussed above, heating the fiber cores results in an expansion of the mode field diameters of the cores. With continued heating, the mode field expansion may become so large that there may be overlap between the mode fields of the different cores within a common cladding. This may result in an undesirable coupling between the signals carried in the different cores. Spacer 880 may be used to physically separate the cores of claddings 812 and 822 so that their mode fields 887 and 889, respectively may be further expanded. The spacer 880 (also known as a non-core fiber) is constructed from a material similar to the cladding material with the same refractive index but with no guiding properties, for example, silica. In one embodiment, spacer 880 is used to allow for greater mode field expansion while minimizing coupling between the cores.

In another embodiment, the non-core spacer 880 may be used to reduce, or even minimize, diffraction effects at the core-air interface. Diffraction effects are caused by interference at the glass-air boundary at the end of the fiber. The diffraction effects result in insertion losses which reduce the amount of power that may be transferred between fibers. By adding non-core spacers, for example, the total outside diameter of the fiber is increased by a factor of the square root of three. In general, a wider diameter fiber results in less divergence of light waves exiting the end of the fiber.

In addition, the use of the spacer fiber allows for physical separation of the light waves exiting the cores. Light exiting from cores separated by different physical dimensions will have different incident angles on components that are coupled to the end of the fiber. For example, if a lens is coupled to the end of the fiber, the light waves from an outer core separated by two non-core spacers will be incident on the lens at a different angle than light emitted from a central core. In one embodiment, a filter is used to filter out light waves from the cores based on the incidence angle of light on the lens emitted from the cores.

It should be noted that the process described herein is not limited to only twin core fibers or fibers using a single spacer and may be used to manufacture fibers having more than two cores and utilizing more than a single spacer as illustrated in FIG. 8.

Figure 9:
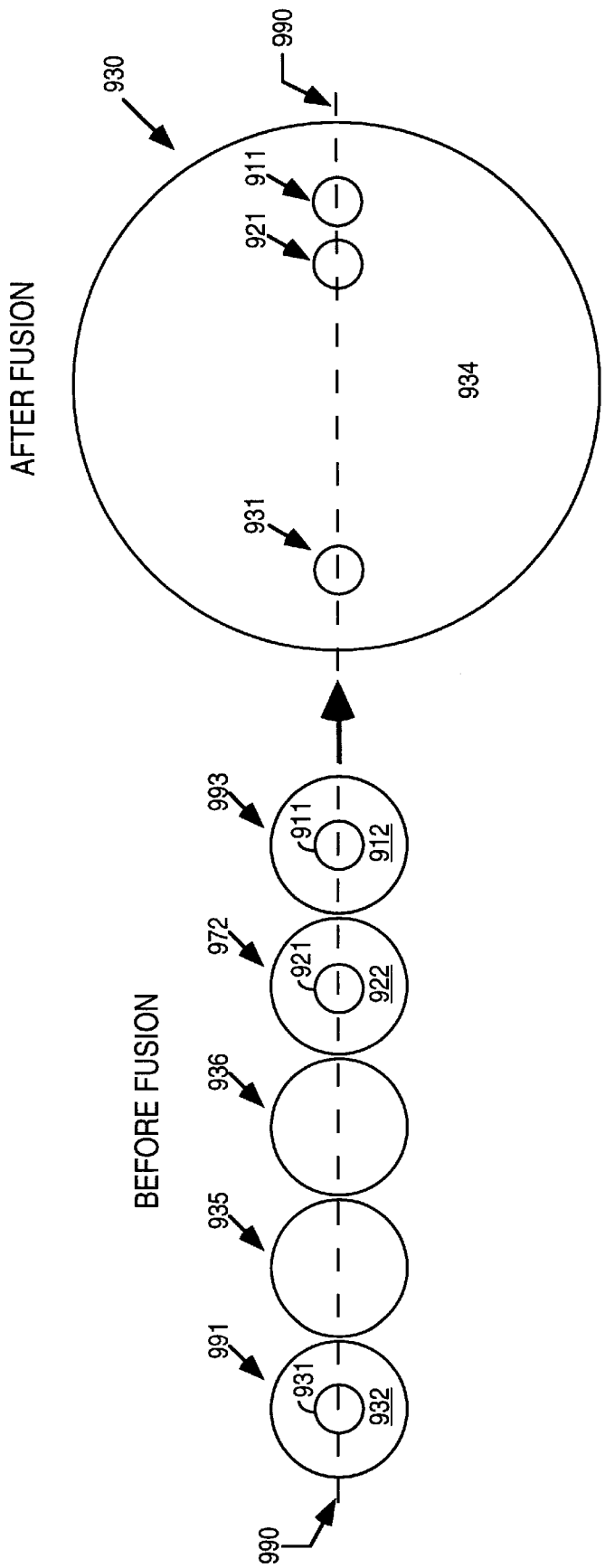
FIG. 9 illustrates a cross-section of one embodiment of a multiple core fiber having multiple non-core spacers.

FIG. 9 illustrates a cross-section of one embodiment of a multiple core fiber having multiple non-core spacers. In one embodiment, two spacers 935 and 936 are positioned between core fibers 991 and 992 that are stripped of their protective jackets. A third core fiber 993 is positioned on the side of core fiber 992 opposite that of core fiber 992. In an alternative embodiment, a different number of spacers may be used in between core fibers. In yet another embodiment, spacers may be placed on the outside of core fibers.

Multiple core fiber 930 is manufactured using a fusion process similar to that described above. After the fusion process, multiple core fiber 930 has three cores 911, 921, and 931, surrounded by a common cladding 934. During the fusion process, the spacers 935 and 936 become fused with the claddings 921, 922, and 932 that surround cores 911, 921, and 931, respectively. The common cladding 934 exists along a length of the claddings and spacers (into the page) that are aligned with each other during the fusion process. The cores 911, 921, and 931 have centers that are substantially aligned in one line 990.

Figure 10:
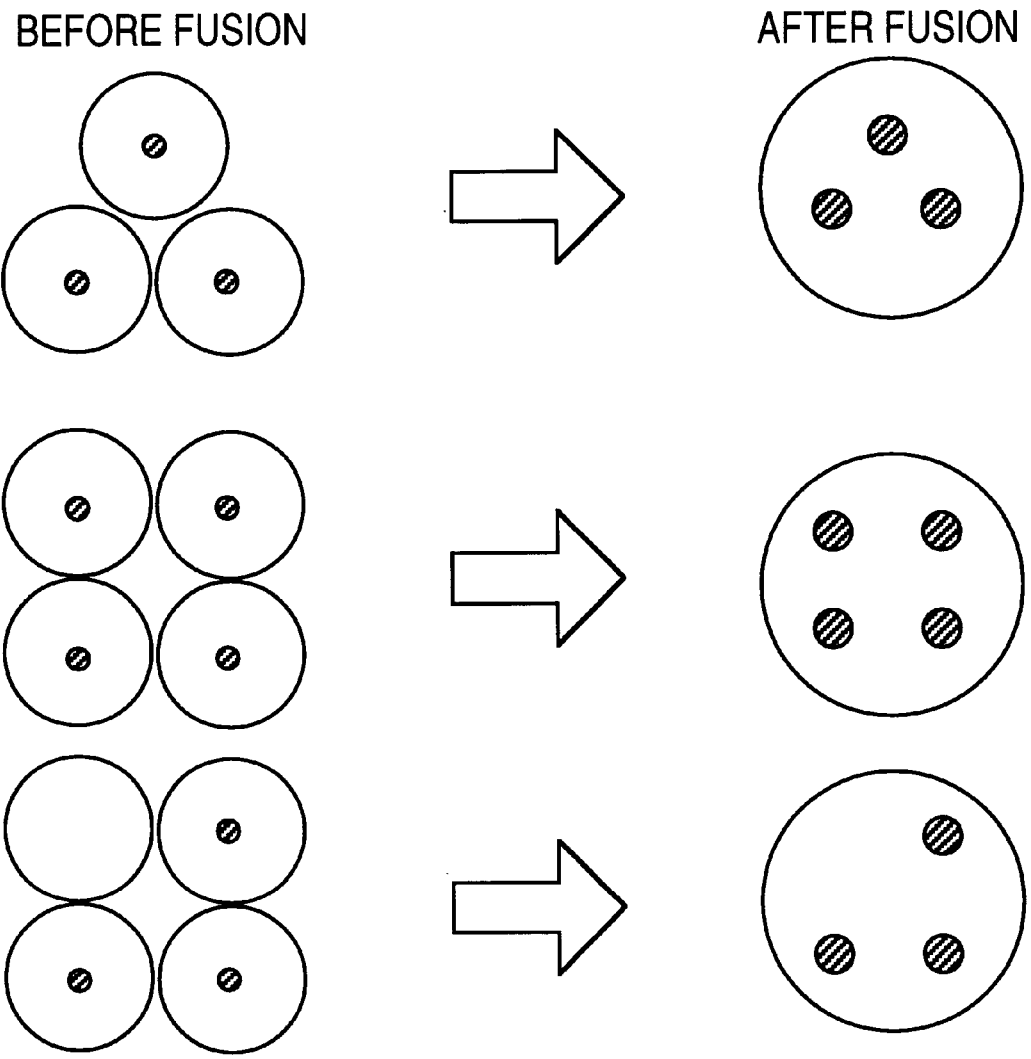
FIG. 10 illustrates cross-sections of alternative embodiments of a multiple core fiber after a fusion process.

It should noted, again, that the dimensions provided herein are only for exemplary purposes and other dimensions may be used. It should also be noted that the above described process is not limited to only fibers having multiple cores substantially aligned within one line, but may also be used to fabricate fibers having cores that aligned in other arrangements as illustrated in FIG. 10.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A multiple core optical fiber, comprising:
   a plurality of cores having centers arranged substantially on one line; and
   a common cladding surrounding the plurality of cores along a predetermined length of the plurality of cores;
   each of the plurality of cores having a first mode field diameter inside the predetermined length of the plurality of cores different than a second mode field diameter outside the predetermined length.

2. The optical fiber of claim 1, wherein the first mode field diameter is wider than the second mode field diameter.

3. The optical fiber of claim 2, wherein the step index profile gradually transitions to the graded index profile.

4. The optical fiber of claim 1, wherein the plurality of cores have a first index of refraction inside the predetermined length and a second index of refraction outside the predetermined length.

5. The optical fiber of claim 4, wherein the first index of refraction has approximately a step index profile and wherein the second index of refraction has a graded index profile.

6. The optical fiber of claim 1, further comprising:
   a first non-core spacer having a center arranged substantially on the one line of the plurality of cores, the first non-core spacer disposed between the plurality of cores.

7. The optical fiber of claim 6, further comprising:
   a second non-core spacer having a center arranged substantially on the one line of the plurality of cores, the second non-core spacer positioned on an end of the one line of the plurality of cores.

8. The optical fiber of claim 1, wherein each of the plurality of cores is surrounded by separate claddings outside the predetermined length, each of the separate claddings surrounded by separate protective coatings.

9. The optical fiber of claim 1, wherein the first mode field diameter of one of the plurality of cores is substantially non-overlapping with the first mode field diameter of another of the plurality of cores.

10. The optical fiber of claim 1, further comprising:
    a plurality of non-core spacers having centers arranged substantially on the one line of the plurality of cores, the plurality of non-core spacers disposed between the plurality of cores.

11. The optical fiber of claim 1, wherein a second center of a second core is spaced a distance away from a first center of a first core and wherein a third center of a third core is spaced a different distance away from the first center of the first core.

12. A method of manufacturing a multiple core optical fiber, comprising:
    aligning a center of a first core having a first cladding with a center of a second core having a second cladding along a length of the first and the second cores, the first and the second cores having mode field diameters;
    fusing the first and the second claddings together along the length; and
    expanding the mode field diameters of the first and the second cores without substantially coupling the first and the second cores.

13. The method of claim 12, wherein the fusing and expanding steps comprise applying a heat source to the first and the second claddings along the length.

14. The method of claim 13, wherein the mode field diameters are expanded to a different extent along the length than outside the length.

15. The method of claim 14, wherein the first and the second mode field diameters are non-overlapping.

16. The method of claim 15, further comprising cutting the multiple core optical fiber at a point disposed along the length to form a fiber end having an outer surface.

17. The method of claim 16, further comprising encasing the fiber end in a hollow tube having an inner surface.

18. The method of claim 17, wherein an approximately cylindrical cavity is formed between the outer surface of the fiber end and the inner surface of the tube and wherein the method further comprises filling the cavity with an epoxy.

19. The method of claim 13, wherein the heat source is scanned at a first rate across the length to expand the mode field diameters.

20. The method of claim 19, wherein the mode field diameters are expanded to a different extent along the first portion of the length than the second portion of the length.

21. A method of manufacturing a multiple core optical fiber, comprising:

aligning a center of a first core having a first cladding with a center of a second core having a second cladding along a length of the first and the second cores, the first and the second cores having mode field diameters;

aligning a center of a non-core spacer with the centers of the first and the second cores;

fusing the first cladding, the second cladding, and the non-core spacer together along the length without stretching the first and the second cores; and expanding the mode field diameters of the first and the second cores.

22. The method of claim 21, wherein the non-core spacer is positioned in between the first and the second cores.

23. The method of claim 21, wherein the non-core spacer is positioned on an outside of the first and the second cores.

24. A multiple core optical fiber, comprising:

a plurality of cores; and a non-etched fused cladding surrounding each of the plurality of cores, the non-etched fused cladding forming a common cladding region along a predetermined length of the plurality of cores, the plurality of cores spaced in close proximity to each other without resulting in coupling between the plurality of cores.

25. The optical fiber of claim 24, wherein each of the plurality of cores has a first mode field diameter inside the predetermined length of the plurality of cores different than a second mode field diameter outside the predetermined length.

26. The optical fiber of claim 25, wherein the first mode field diameter of one of the plurality of cores is substantially non-overlapping with the first mode field diameter of another of the plurality of cores.

27. The optical fiber of claim 24, wherein the common cladding has an approximately ovate outer surface.

* * * * *